US012219459B2

(12) United States Patent
Zhou et al.

(10) Patent No.: US 12,219,459 B2
(45) Date of Patent: Feb. 4, 2025

(54) PROVISIONING TRAFFIC STEERING WITH MULTI-ACCESS RELATED INFORMATION

(71) Applicant: ZTE Corporation, Guangdong (CN)

(72) Inventors: Xingyue Zhou, Guangdong (CN); Jinguo Zhu, Guangdong (CN); Shuang Liang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 344 days.

(21) Appl. No.: 17/865,234

(22) Filed: Jul. 14, 2022

(65) Prior Publication Data

US 2022/0353788 A1 Nov. 3, 2022

Related U.S. Application Data

(63) Continuation of application No. PCT/CN2020/072211, filed on Jan. 15, 2020.

(51) Int. Cl.
*H04W 40/24* (2009.01)
*H04L 45/24* (2022.01)
*H04W 40/02* (2009.01)

(52) U.S. Cl.
CPC .......... *H04W 40/248* (2013.01); *H04L 45/24* (2013.01); *H04W 40/02* (2013.01)

(58) Field of Classification Search
None
See application file for complete search history.

(56) References Cited

U.S. PATENT DOCUMENTS

| 9,043,862 | B2 | 5/2015 | Ahmavaara et al. |
| 10,986,516 | B2 | 4/2021 | Dao et al. |
| 2012/0020345 | A1 | 1/2012 | Zhou et al. |
| 2016/0072823 | A1* | 3/2016 | Faccin ................. H04W 12/08 726/1 |
| 2018/0103123 | A1* | 4/2018 | Skog ....................... H04L 69/14 |

(Continued)

FOREIGN PATENT DOCUMENTS

| CN | 101939968 A | 1/2011 |
| CN | 110366271 A | 10/2019 |

(Continued)

OTHER PUBLICATIONS

European Search Report for EP Patent Application No. 20888690.3, dated Nov. 29, 2022, 10 pages.

(Continued)

*Primary Examiner* — Kenny S Lin
(74) *Attorney, Agent, or Firm* — Perkins Coie LLP

(57) ABSTRACT

Methods, apparatus, and systems for enabling an application function to influence access traffic steering, switching, splitting control are described. In one example aspect, a wireless communication method includes transmitting a request from an application function to a network function to enable a creation or an update of a policy or a rule for traffic routing. The request includes one or more parameters indicating traffic routing information for one or more user devices. The one or more parameters comprise at least an access type preference for the one or more user devices. The method also (Continued)

includes receiving a response from the network function indicating the creation or the update of the policy or the rule for traffic routing.

20 Claims, 12 Drawing Sheets

(56) References Cited

U.S. PATENT DOCUMENTS

| | | | |
|---|---|---|---|
| 2018/0192471 A1 | 7/2018 | Li et al. | |
| 2018/0331944 A1 | 11/2018 | Salkintzis | |
| 2019/0357082 A1 | 11/2019 | Kim et al. | |
| 2019/0357294 A1 | 11/2019 | Ha et al. | |
| 2019/0394279 A1* | 12/2019 | Dao | H04L 67/14 |
| 2020/0053562 A1* | 2/2020 | Kim | H04W 8/02 |
| 2020/0196169 A1* | 6/2020 | Dao | H04W 72/535 |
| 2020/0413466 A1 | 12/2020 | Yu | |
| 2021/0352749 A1* | 11/2021 | Szilagyi | H04W 80/06 |
| 2022/0312510 A1* | 9/2022 | Keller | H04M 15/66 |

FOREIGN PATENT DOCUMENTS

| | | |
|---|---|---|
| CN | 110383877 A | 10/2019 |
| WO | 2019192528 A1 | 10/2019 |

OTHER PUBLICATIONS

Japanese office action issued in JP Patent Application No. 2022-543468, dated Jul. 10, 2023, 10 pages. English translation included.
EGPP TS 23.501 V16.3.0 (Dec. 2019); Technical Specification; 3rd Generation Partnership Project; Technical Specification Group Services and System Aspects; System architecture for the 5G System (5GS); Stage 2; (Release 16); 417 pages.
International Search Report and Written Opinion for International Application No. PCT/CN2020/072211, mailed on Oct. 9, 2020 (10 pages).
Japanese notice of allowance issued in JP Patent Application No. 2022-543468, dated Mar. 8, 2024, 3 pages. English translation included.
European Communication pursuant to Article 94(3) EPC issued in EP Patent Application No. 20888690.3, dated Feb. 2, 2024, 6 pages.
Chinese Notification to Complete Formalities of Registration issued in CN Patent Application No. 202080091952.2, dated Jul. 24, 2024, 7 pages. English translation included.
Indian First Examination Report issued in IN Patent Application No. 202247041031, dated Oct. 20, 2022, 2 pages.
European Communication pursuant to Article 94(3) EPC issued in EP Patent Application No. 20888690.3, dated Dec. 5, 2024, 6 pages.

* cited by examiner

PROVISIONING TRAFFIC STEERING WITH MULTI-ACCESS RELATED INFORMATION

CROSS-REFERENCE TO RELATED APPLICATIONS

This application is a continuation of International Patent Application No. PCT/CN2020/072211 filed on Jan. 15, 2020, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for enabling an application function to influence access traffic steering, switching, splitting control.

In one example aspect, a wireless communication method is disclosed. The method includes transmitting, by an application function, a request to a network function to create a subscription of one or more events associated with one or more user devices. The one or more events comprise at least one of (1) a first event indicating that the one or more user devices are registered to access a network using an access technology different from a first protocol suite, (2) a second event indicating that the one or more user devices are registered to access the network using a first access technology and a second access technology simultaneously, wherein the first access technology is specified in the first protocol suite and the second access technology is different from the first protocol suite, or (3) a third event indicating a capability of the one or more user devices related to access traffic steering, switching, splitting (ATSSS). The method also includes receiving, by the application function, a response from the network function indicating that the subscription has been created.

In another example aspect, a wireless communication method is disclosed. The method includes receiving, by a network function, a request from an application function to create a subscription of one or more events associated with one or more user devices. The one or more events comprise at least one of (1) a first event indicating that the one or more user devices are registered to access a network using an access technology different from a first protocol suite, (2) a second event indicating that the one or more user devices are registered to access the network using a first access technology and a second access technology simultaneously, wherein the first access technology is specified in the first protocol suite and the second access technology is different from the first protocol suite, or (3) a third event indicating a capability of the one or more user devices related to access traffic steering, switching, splitting (ATSSS). The method also includes transmitting, by the network function, a response to the application function indicating that the subscription has been created.

In another example aspect, a wireless communication method is disclosed. The method includes transmitting a request from an application function to a network function to enable a creation or an update of a policy or a rule for traffic routing. The request includes one or more parameters indicating traffic routing information for one or more user devices. The one or more parameters comprise at least an access type preference for the one or more user devices. The method also includes receiving a response from the network function indicating the creation or the update of the policy or the rule for traffic routing.

In another example aspect, a wireless communication method is disclosed. The method includes receiving, by a policy control function, a request including one or more parameters indicating traffic routing information for one or more user devices. The one or more parameters comprise at least an access type preference for the one or more user devices. The method also includes creating or updating a policy or a rule for traffic routing based on the one or more parameters.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

The capability to use both Third Generation Partnership Project (3GPP) and Non-3GPP access networks has been provided in Long Term Evolution (LTE) technology. Techniques became available for determining how data needs to be split and transmitted over different access networks. In 5G communication systems, Access Traffic Steering, Switching and Splitting (ATSSS) requires the core network to provide similar functionality using rules that dictate how devices should use 3GPP and non-3GPP access networks that are available. The steering functionality includes higher layer steering functionality, such as Multipath Transmission Control Protocol (MPTCP) that is carried out above Internet Protocol (IP) in the protocol stack, as well as lower layer steering functionality, such as load balancing and priority-based steering.

Figure 1:
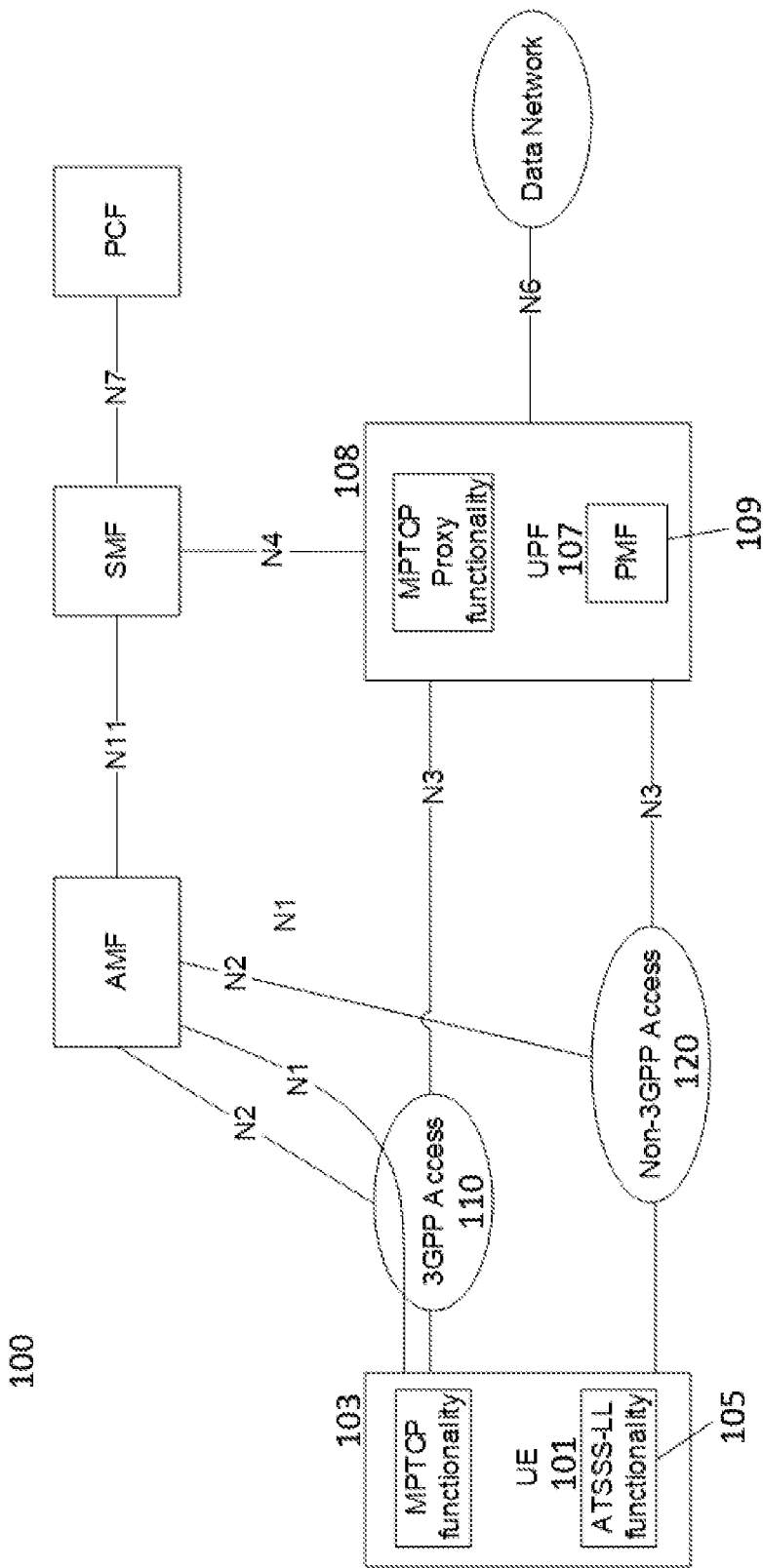
FIG. 1 illustrates an example 5G system architecture that supports access traffic steering, switching, splitting (ATSSS).

FIG. 1 illustrates an example 5G system architecture that supports ATSSS. In this architecture, the User Equipment (UE) 101 supports one or more of the steering functionalities, such as MPTCP functionality 103 and/or ATSSS Low-Layer (ATSSS-LL) functionality 105. Each steering functionality in the UE enables traffic steering, switching and splitting across 3GPP access 110 and non-3GPP access 120 in accordance with the ATSSS rules provided by the network. The User Plane Function (UPF) 107 can support MPTCP proxy functionality 108, which communicates with the MPTCP functionality 103 in the UE by the MPTCP protocol. The UPF can also support ATSSS-LL functionality. In addition, the UPF supports Performance Measurement Functionality (PMF) 109, which may be used by the UE to obtain access performance measurements over the user plane of 3GPP access and/or over the user plane of non-3GPP access. 5G systems also support the exposure of network information and capabilities to external consumers. For example, multi-access edge computing (MEC) can interact with the 5G system as an Application Function (AF) to perform at least the following:

(1) influencing the application traffic routing decisions, UPF selections or reselections,
(2) accessing the Network Exposure Function (NEF) for network capabilities, and/or
(3) interacting with the policy framework for policy control.

The NEF is the 5G network function (NF) in charge of securely exposing the network capabilities and events to AFs and other consumers. External exposure can be categorized as monitoring capability, provisioning capability, and policy/charging capability.

There are two categories of AFs. Trusted AFs are located in inside the trust domain owned or operated by a Network Operator. Untrusted AFs are located outside of the trust domain of a network operator and are not allowed by the operator to access the target NFs directly. An untrusted AF can be owned and operated by external entities such as a cloud or edge Service Provider, a gaming service provider, etc.

MEC system that appears as an Application Function or Application Functions to a 5G system can provide functions at host level and system level. Host level functions include MEC Platform, MEC applications, and Virtualization Infrastructure. Host level management functions include MEC Platform Manager and Virtualization Infrastructure Manager. System level functions include MEC Orchestrator and Operation Support System function. The following examples illustrate the principle of MEC integration in the 5G system. An individual MEC application can appear as an AF to the 5G system. Similarly, a MEC platform that influences the traffic routing of the MEC application's traffic can appear as an AF to the 5G system. In yet another example the MEC orchestrator that is of a UPF change can appear as an AF to the 5G system. The 5G system exposes capabilities and information through a set of APIs to the AFs. Depending on the API(s), the MEC AF may be represented by a different functional entities of the MEC system.

Currently, within the 5G core networks, control of ATSSS is handled by Policy Control Function (PCF) only. However, MEC applications have different requirements with respect to multi-access traffic steering. For example, a background application, e.g. email, drop-box, etc. may not care about delay or throughput, and therefore may prefer the connection with lower cost, e.g. Wi-Fi. In another example, an ultra-reliable and low-latency (URLLC) communication application, e.g. robot control, industrial applications, etc., requires very high reliability and low latency, and therefore prefers sending duplicated packets over multiple connections simultaneously. Similarly, a real-time high-definition video streaming application requires high throughput and therefore may prefer splitting traffic over multiple connections (e.g., via bandwidth aggregation).

Therefore, there remains a need to allow an AF (e.g., MEC AF) to influence the control of ATSSS so as to satisfy different network requirements while maintaining security and privacy of operator's network. Techniques are disclosed herein to enable an AF (e.g., MEC AF) to subscribe to events related to ATSSS and to relay information to the PCF to influence the creation or update of rules and/or policies for ATSSS control based on the network requirements.

Figure 2:
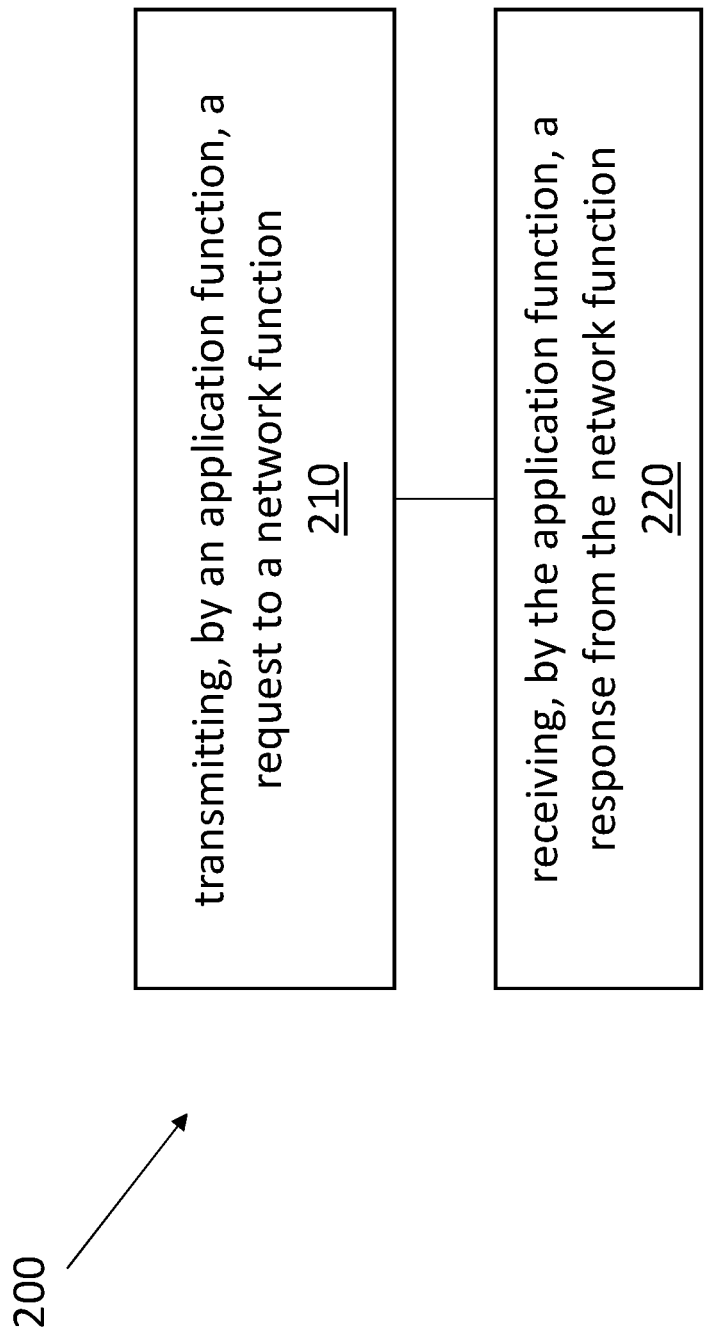
FIG. 2 illustrates an example method for wireless communication in accordance with the present technology.

FIG. 2 illustrates an example method 200 for wireless communication in accordance with the present technology. The method 200 includes, at operation 210, transmitting, by an application function, a request to a network function to create a subscription of one or more events associated with one or more user devices. The one or more user devices can be any user device(s) or user device group(s). The one or more events includes at least one of:

(1) A first event indicating that the one or more user devices are registered to access a network using an access technology different from a first protocol suite. For example, the first protocol suite includes 3GPP access. The first event indicates that the one or more user devices are registered to access the network using non-3GPP access.
(2) A second event indicating that the one or more user devices are registered to access the network using a first access technology and a second access technology simultaneously, wherein the first access technology is specified in the first protocol suite (e.g., 3GPP access) and the second access technology is different from the first protocol suite (e.g., non-3GPP access).
(3) A third event indicating a capability of the one or more user devices related to access traffic steering, switching, splitting (ATSSS).

The method 200 also includes, at operation 220, receiving, by the application function, a response from the network function indicating that the subscription has been created. In some embodiments, the capability of the one or more user devices related to ATSSS comprises at least one of: (1) ATSSS low-layer, (2) multipath TCP protocol, or (3) multipath extensions for QUIC. In some embodiments, the network function comprises a network exposure function.

Figure 3:
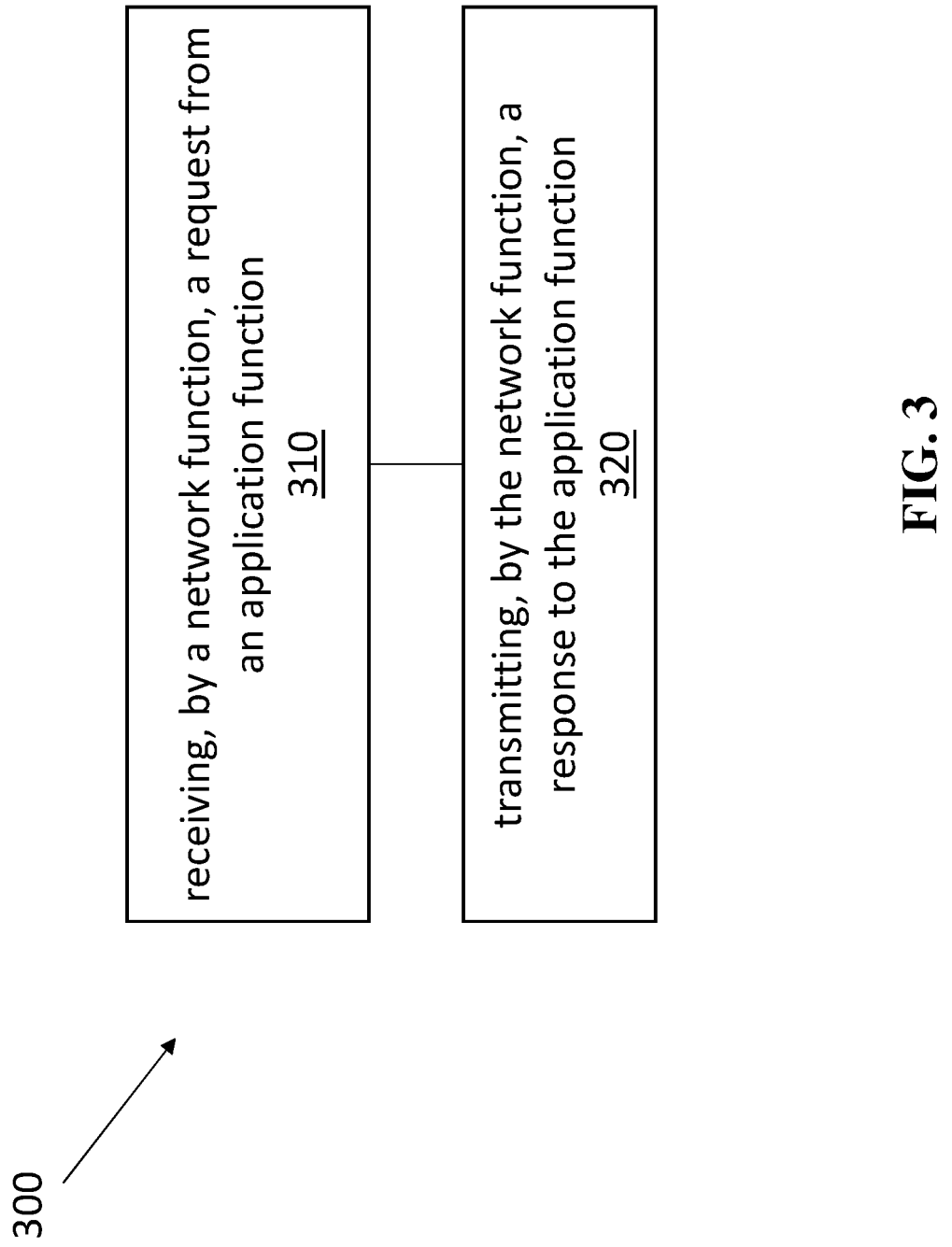
FIG. 3 illustrates another example method for wireless communication in accordance with the present technology.

FIG. 3 illustrates an example method 300 for wireless communication in accordance with the present technology. The method 300 includes, at operation 310, receiving, by a network function, a request from an application function to create a subscription of one or more events associated with one or more user devices. The one or more user devices can be any user device(s) or user device group(s). The one or more events include at least one of:
(1) A first event indicating that the one or more user devices are registered to access a network using an access technology different from a first protocol suite. For example, the first protocol suite includes 3GPP access. The first event indicates that the one or more user devices are registered to access the network using non-3GPP access.
(2) A second event indicating that the one or more user devices are registered to access the network using a first access technology and a second access technology simultaneously, wherein the first access technology is specified in the first protocol suite (e.g., 3GPP access) and the second access technology is different from the first protocol suite (e.g., non-3GPP access).
(3) A third event indicating a capability of the one or more user devices related to access traffic steering, switching, splitting (ATSSS).

The method 300 also includes, at operation 320, transmitting, by the network function, a response to the application function indicating that the subscription has been created.

In some embodiments, the capability of the one or more user devices related to ATSSS comprises at least one of: (1) ATSSS low-layer, (2) multipath TCP protocol, or (3) multipath extensions for QUIC. In some embodiments, the network function comprises a network exposure function.

In some embodiments, the method includes transmitting, from the network function, information about the subscription of the one or more events to a data management node to allow the data management node to forward the information to an access management function in case the one or more events comprise the first event or the second event. In some embodiments, the method includes transmitting, from the network function, information about the subscription of the one or more events to a data management node to allow the data management node to forward the information to a session management function in case the one or more events comprise the third event.

Figure 4:
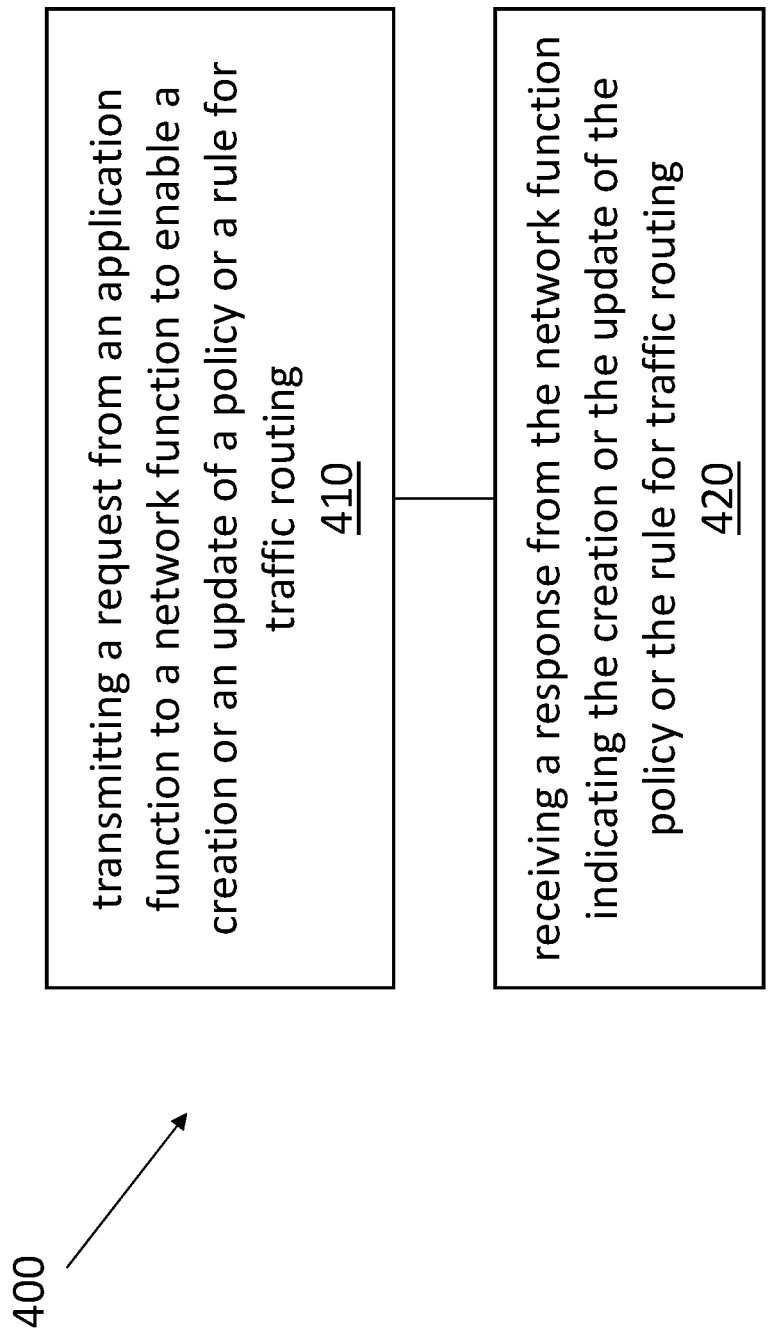
FIG. 4 illustrates another example method for wireless communication in accordance with the present technology.

FIG. 4 illustrates an example method 400 for wireless communication in accordance with the present technology. The method 400 includes, at operation 410, transmitting a request from an application function to a network function to enable a creation or an update of a policy or a rule for traffic routing. The request includes one or more parameters indicating traffic routing information for one or more user devices. The one or more user devices can be any user device(s) or user device group(s). The one or more parameters comprise at least an access type preference for the one or more user devices. The method 400 includes, at operation 420, receiving a response from the network function indicating the creation or the update of the policy or the rule for traffic routing.

In some embodiments, the network function comprises a network exposure function or a policy control function. In some embodiments, the access type preference indicates a preference for (1) a first access technology in a first protocol suite, (2) a second access technology different from a first protocol suite, or (3) a combination of the first access technology and the second access technology. In some embodiments, the one or more parameters further comprise at least one of: a traffic descriptor, a preferred Internet Protocol (IP) type, a time window for data transfer, or a location criterion.

In some embodiments, the traffic routing information comprises traffic steering requirements. In some embodiments, the one or more parameters comprise server information of Multipath Transmission Control Protocol or Multipath QUIC, the server information comprising at least one of a fully qualified domain name, an Internet Protocol address, or a port number. In some embodiments, the one or more parameters comprise proxy information of Multipath Transmission Control Protocol, the proxy information comprising at least a proxy Internet Protocol address. In some embodiments, the one or more parameters comprise a lower-layer functionality related to access traffic steering, switching, splitting. In some embodiments, the one or more parameters comprise a traffic steering mode. The traffic steering mode comprises at least one of: an active-standby mode, a smallest delay mode, a load balancing mode, or a priority-based mode.

Figure 5:
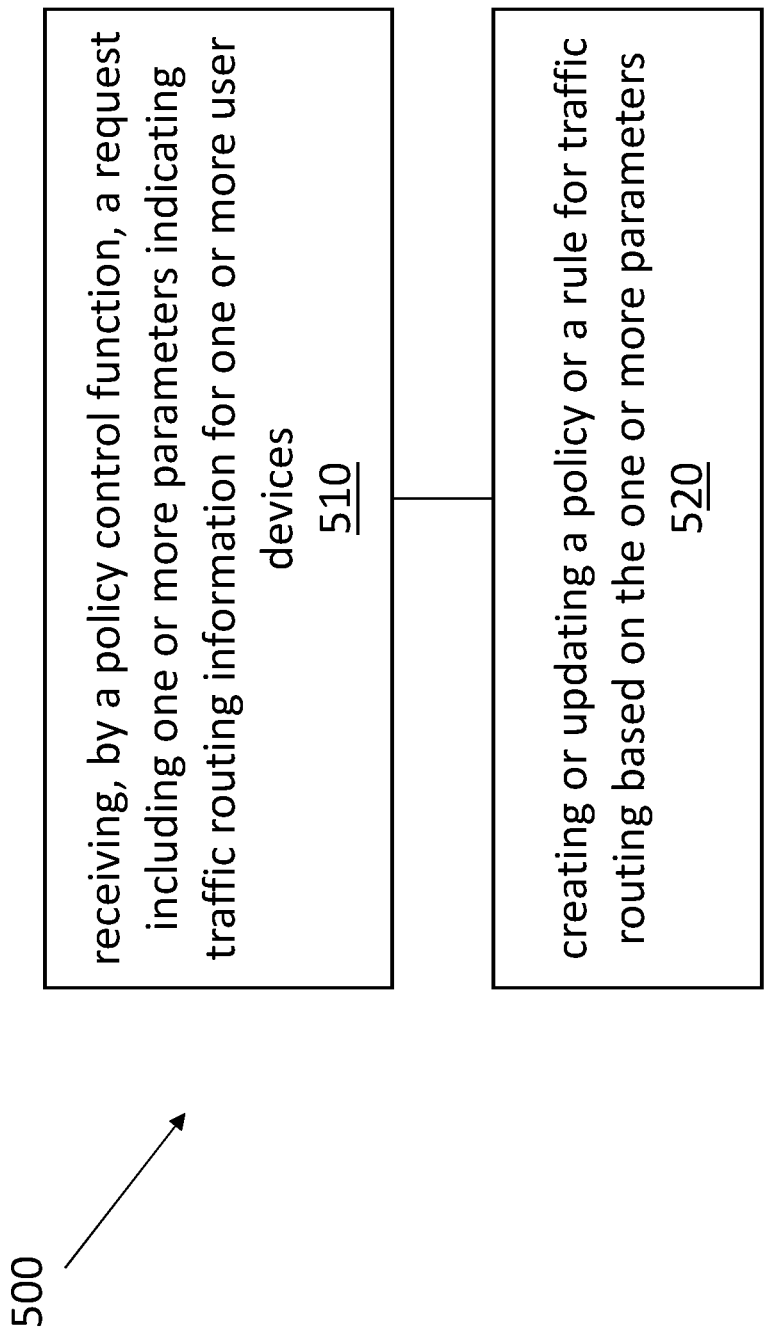
FIG. 5 illustrates yet another example method for wireless communication in accordance with the present technology.

FIG. 5 illustrates an example method 500 for wireless communication in accordance with the present technology. The method 500 includes, at operation 510, receiving, by a policy control function, a request including one or more parameters indicating traffic routing information for one or more user devices. The one or more user devices can be any user device(s) or user device group(s). The one or more parameters comprise at least an access type preference for the one or more user devices. The method 500 also includes, at operation 510, creating or updating a policy or a rule for traffic routing based on the one or more parameters.

In some embodiments, the access type preference indicates a preference for (1) a first access technology in a first protocol suite, (2) a second access technology different from a first protocol suite, or (3) a combination of the first access technology and the second access technology. In some embodiments, the one or more parameters further comprise at least one of: a traffic descriptor, a preferred Internet Protocol (IP) type, a time window for data transfer, or a location criterion.

In some embodiments, the traffic routing information comprises traffic steering requirements. In some embodiments, the one or more parameters comprise server information of Multipath Transmission Control Protocol or Multipath QUIC, the server information comprising at least one of a fully qualified domain name, an Internet Protocol address, or a port number. In some embodiments, the one or more parameters comprise proxy information of Multipath Transmission Control Protocol, the proxy information comprising at least a proxy Internet Protocol address. In some embodiments, the one or more parameters comprise a lower-layer functionality related to access traffic steering, switching, splitting. In some embodiments, the one or more parameters comprise a traffic steering mode. The traffic steering mode comprises at least one of: an active-standby mode, a smallest delay mode, a load balancing mode, or a priority-based mode.

As further described in the present document, the above-described methods provide means to influence ATSSS control based on different network requirements. Instead of relying solely on the PCF to make ATSSS related determinations, an AF (e.g., an MEC AF) can send relevant information assisting the PCF to create or update rules and/or polices for ATSSS. Some examples of the disclosed techniques are described in the following example embodiments.

Embodiment 1

Figure 6:
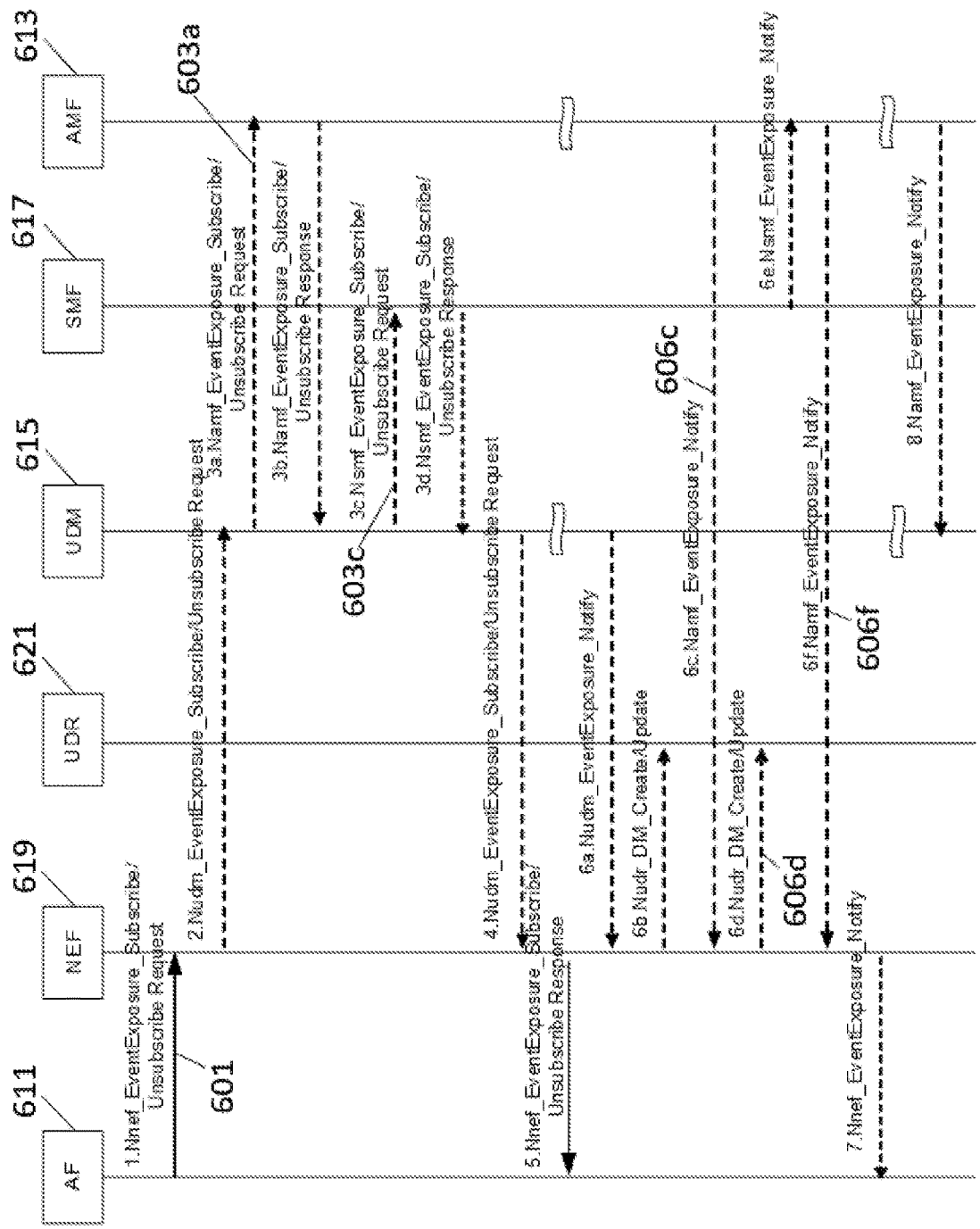
FIG. 6 illustrates a sequence diagram of subscribing to ATSSS events in accordance with the present technology.

This embodiment describes techniques that can be implemented to allow an AF (e.g., MEC AF) to subscribe to events related to ATSSS. FIG. 6 illustrates a sequence diagram of subscribing to ATSSS events in accordance with the present technology. The AF can subscribe to notifications of the events from the 5G core network.

In Operation 601, an AF (e.g., MEC) 611 can subscribe one of or more of the following events in the 5G core network:
(a) when one or more user devices are registered to access the network using non-3GPP access;
(b) when one or more user devices are registered to access the network using both 3GPP access and non-3GPP access simultaneously; or
(c) when one or more user devices indicate the multi-access traffic steering related capability (e.g. ATSSS-LL, MPTCP, MP-QUIC, etc).

These events can be identified by respective event identifiers (IDs). The AF 611 also provides an associated notification endpoint of the AF in spending Nnef_EventExposure_Subscribe request.

For event (a) and/or event (b), assistance from the Access Management Function (AMF) 613 may be needed in Operation 603a. The Unified Data Management (UDM) 615 sends Namf_EventExposure_Subscribe to the AMF to serve the requested user.

For event (c), assistance from the Session Management Function (SMF) 617 may be needed in Operation 603c. For existing PDU session(s) or during the PDU session establishment procedure, the UDM sends the Nsmf_EventExposure_Subscribe to the SMF(s) to serve the requested user.

In Operations 606c and 606d, the AMF 613 detects the event (a) or event (b) occurs and sends the event report by Namf_EventExposure_Notify message to the associated notification endpoint of the NEF 619 along with the time stamp. The NEF 619 may store the information in the User Data Repository (UDR) 621 along with the time stamp using either Nudr_DM_Create or Nudr_DM_Update service operation as appropriate.

In Operation 606e, when the SMF 617 learns from the PDU session establishment procedure that the UE supporting ATSSS-LL, MPTCP or MP-QUIC or any combined of multi-access traffic steering related capabilities, the SMF 617 sends the event report by Nsmf_EventExposure_Notify message (including NEF reference ID) to the AMF 613 indicated as the notification endpoint.

In Operation 606f, the AMF 613 detects that the UE is reachable and sends the event report by Namf_EventExposure_Notify message only to the NEF 619 indicated as the notification endpoint.

Embodiment 2

After the AF (e.g., MEC AF) subscribes to user events, the AF can transmit information to the PCF to impact the creation or update of rules and/or policies for ATSSS control. This embodiment describes that an AF provides traffic routing related information to the PCF directly or via the NEF. The PCF can create or update the UE Route Selection Policies (URSP) based on the received traffic routing related information.

Figure 7:
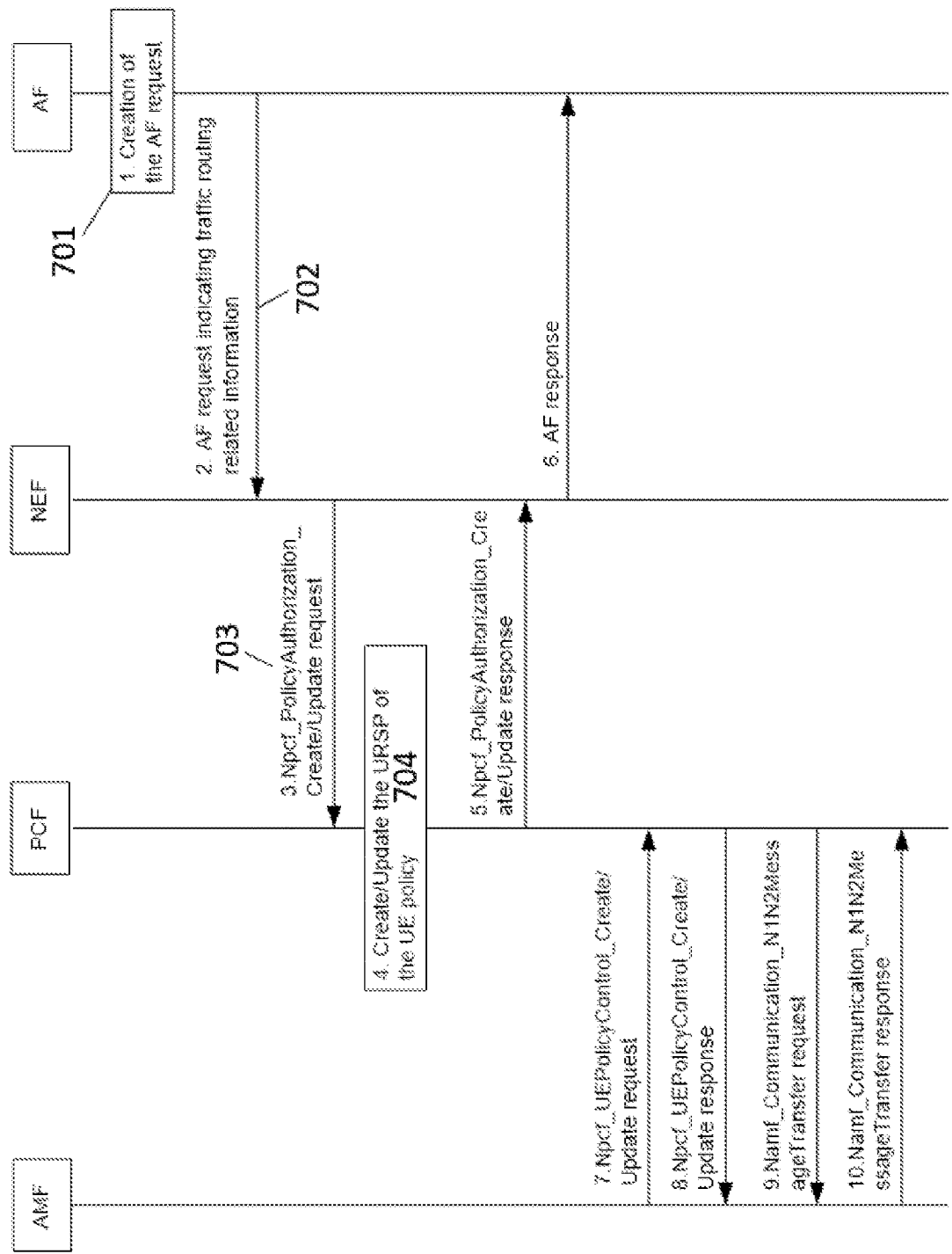
FIG. 7 illustrates a sequence diagram of an example procedure in which an application function (AF) provides routing information to the Policy Control Function (PCF) via the Network Exposure Function (NEF) in accordance with the present technology.

FIG. 7 illustrates a sequence diagram of an example procedure in which an AF provides routing information to the PCF via the NEF in accordance with the present technology. The AF in this example can be an untrusted AF.

Operation 701: An AF creates an AF request including traffic routing related information for one or more user devices. The one or more user devices can be one or more UEs or one or more UE groups. The AF request includes traffic descriptor(s) that specify matching criteria for the routing policy. The AF request can also include additional parameters that can influence the URSP determination by the PCF. The parameters include but are not limited to: preferred IP type (e.g., IPv4, IPv6, IPv4v6), access type preference (e.g. 3GPP access, non-3GPP access, or multi-access), a time window for future background data transfer, or location criteria. In some embodiments, the parameters are optionally included in the request message. In some embodiments, the AF request includes at least a parameter indicating the access type preference.

Operation 702: The AF transmits the AF request to the NEF.

Operation 703: The NEF forwards the AF request to the PCF.

Operation 704: The PCF creates or updates the URSP for the UE based on the received traffic routing related information.

The PCF then sends the response message to the NEF, which sends the response message to the AF correspondingly. Based on local policy, the AMF can contact the PCF to create the UE policy association with the PCF and to retrieve the UE policy. The AMF invokes the Npcf_UEPolicyControl_Create service operation. The AMF sends a response to the PCF, and the PCF sends the UE policy including the created or updated URSP to the UE via the AMF by invoking the Namf_Communication_N1N2MessageTransfer service operation. The AMF then sends a response to the Namf_Communication_N1N2MessageTransfer service operation.

Figure 8:
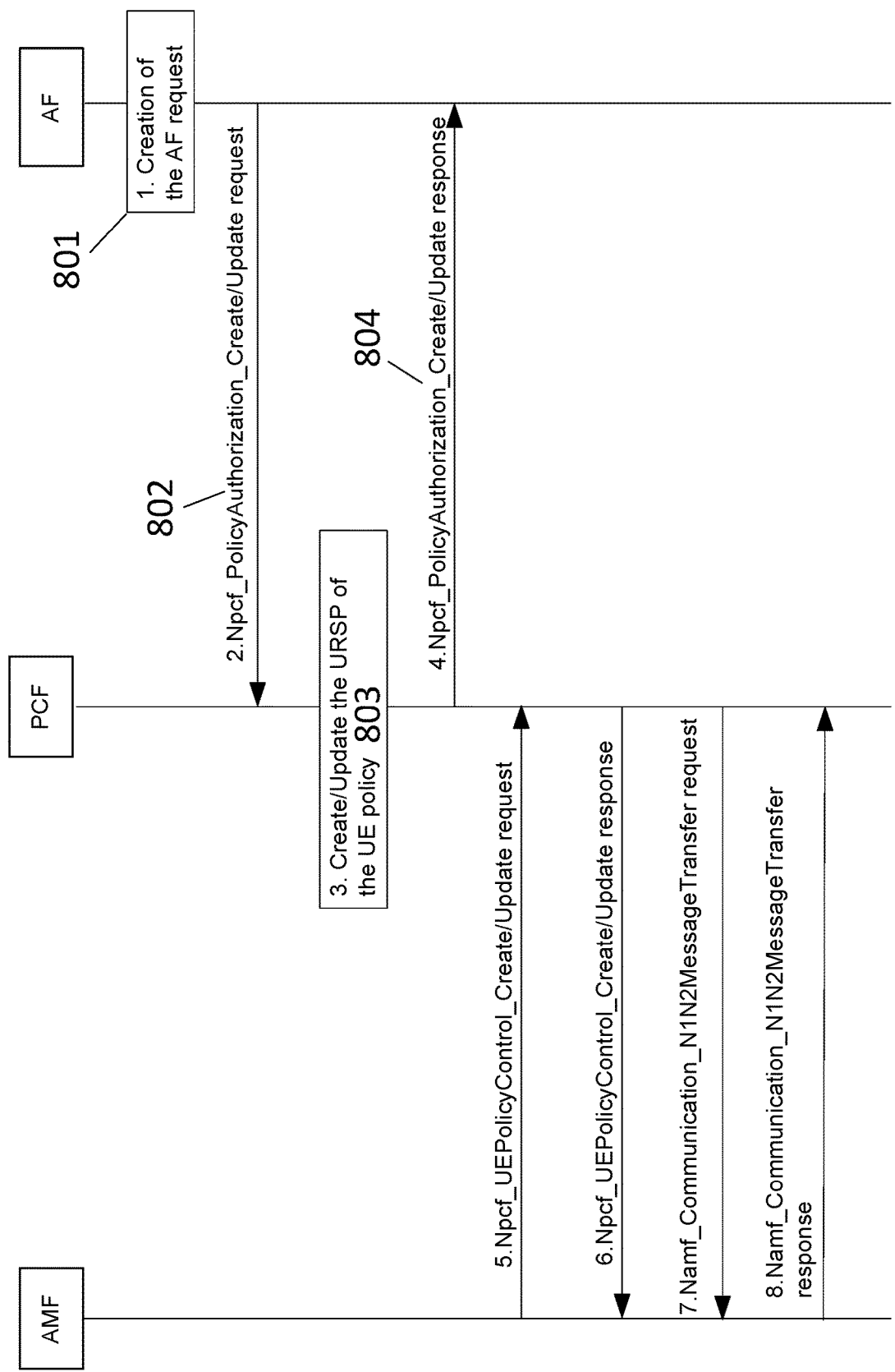
FIG. 8 illustrates a sequence diagram of an example procedure in which an AF provides routing information directly to the PCF in accordance with the present technology.

FIG. 8 illustrates a sequence diagram of an example procedure in which an AF provides routing information directly to the PCF in accordance with the present technology. The AF in this example can be a trusted AF.

Operation 801: An AF creates a request including traffic routing related information for one or more user devices. The one or more user devices can be one or more UEs or one or more UE groups. The request includes traffic routing related information, such as traffic descriptor(s) that specify matching criteria for the routing policy. The request can also include additional parameters that can influence the URSP determination by the PCF. The parameters include but are not limited to: preferred IP type (e.g., IPv4, IPv6, IPv4v6), access type preference (e.g. 3GPP access, non-3GPP access, or multi-access), a time window for future background data transfer, or location criteria. In some embodiments, the parameters are optionally included in the request message. In some embodiments, the AF request includes at least a parameter indicating the access type preference.

Operation 802: The AF sends the request as an Npcf_PolicyAuthorization_Create/Update request to the PCF.

Operation 803: The PCF creates or updates the URSP for the UE based on the received traffic routing related information.

Operation 804: The PCF sends the response message to the AF.

Embodiment 3

The MEC can provide multi-access traffic steering requirements to the 5G core network to influence the ATSSS rules determination when (1) the UPF supporting ATSSS network side functionalities (e.g. MPTCP proxy, ATSSS-LL) is co-located with MEC host platform; or b) the MEC application supporting traffic steering functionality (e.g. MPTCP server).

Figure 9:
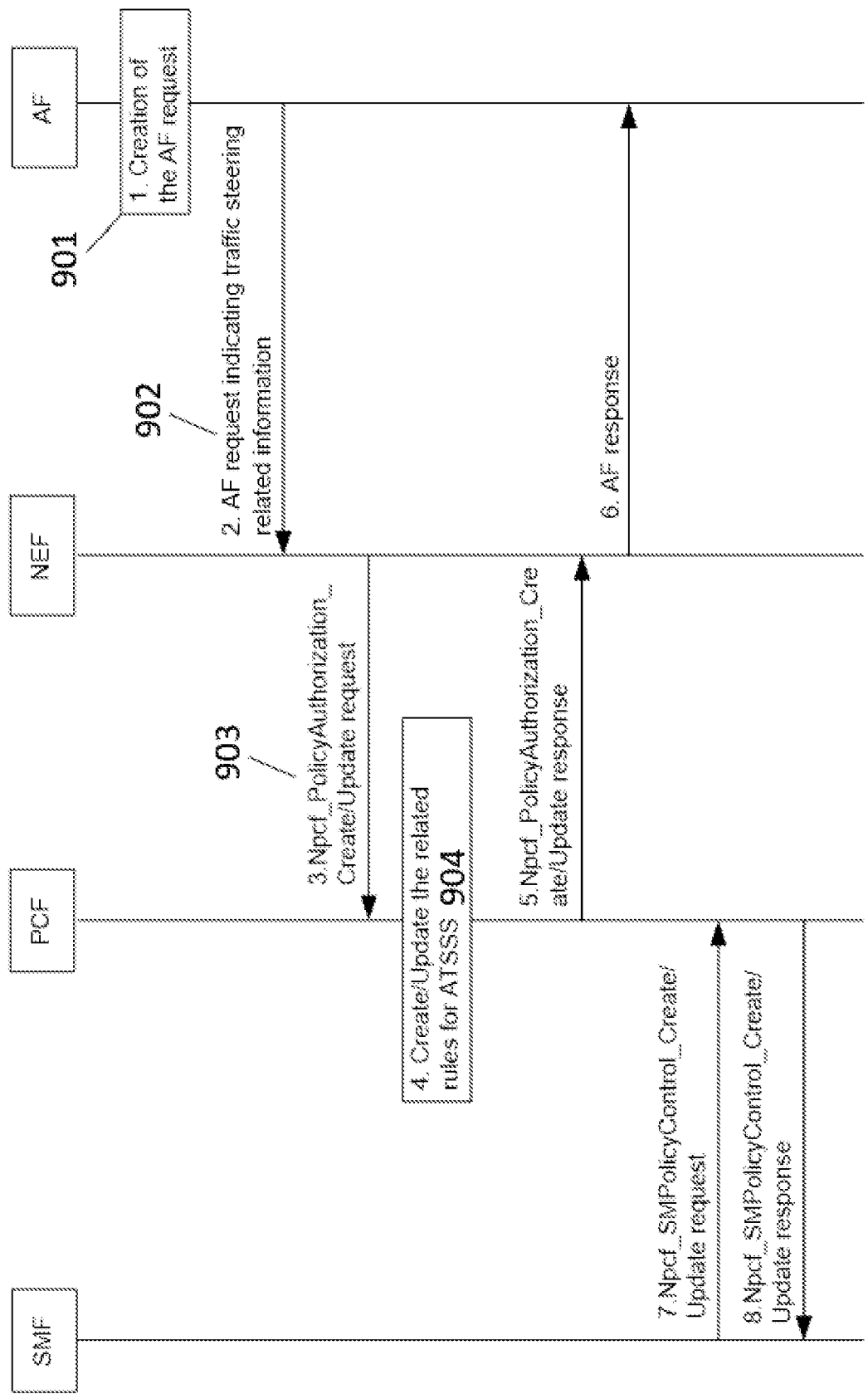
FIG. 9 illustrates a sequence diagram of an example procedure in which an AF provides steering requirements to the PCF via the NEF in accordance with the present technology.

FIG. 9 illustrates a sequence diagram of an example procedure in which an AF (e.g., MEC AF) provides steering requirements to the PCF via the NEF in accordance with the present technology. The AF in this example can be an untrusted AF.

Operation 901: An AF (e.g., MEC AF) creates an AF request about multi-access traffic steering requirements for one or more user devices. The one or more user devices can be one or more UEs or one or more groups of UEs. The request can include application traffic descriptor(s) and steering functionality information. The steering functionality information can include the following:
(1) MPTCP server information, such as Fully Qualified Domain Name (FQDN), IP address, and/or port number;
(2) MPTCP proxy information, such as MPTCP proxy IP address;
(3) MP-QUIC server information, such as FQDN, IP address, and/or port number;
(4) ATSSS-LL functionality.

The steering functionality information can also include information about the steering mode, including but is not limited to:
(a) active-standby: the UE steers the traffic by using the active access if the active access is available. If the active access is not available and the standby access is available, the UE steers the traffic by using the standby access;
(b) smallest delay: the UE steers the traffic by using the access network with the smallest round-trip-time (RTT);
(c) load balancing: the UE steers the traffic across both the 3GPP access and the non-3GPP access with a given percentage; or
(d) priority based: the UE steers the traffic over the access with high priority unless the access with high priority is congested, when the UE steers the SDF over both the access with high priority and the access with low priority.

In some embodiments, at least part of the above parameters regarding steering functionality information is optionally included in the request.

Operation 902: The AF transmits the AF request to the NEF.

Operation 903: The NEF forwards the AF request to the PCF.

Operation 904: The PCF creates or updates the related rules for ATSSS based on the received multi-access traffic steering requirements.

The PCF then sends the response message to AF via the NEF. The SMF invokes the Npcf_SMPolicyControl_Create service operation to retrieve the rules for ATSSS. The PCF sends a response to the SMF with the rules for ATSSS.

Figure 10:
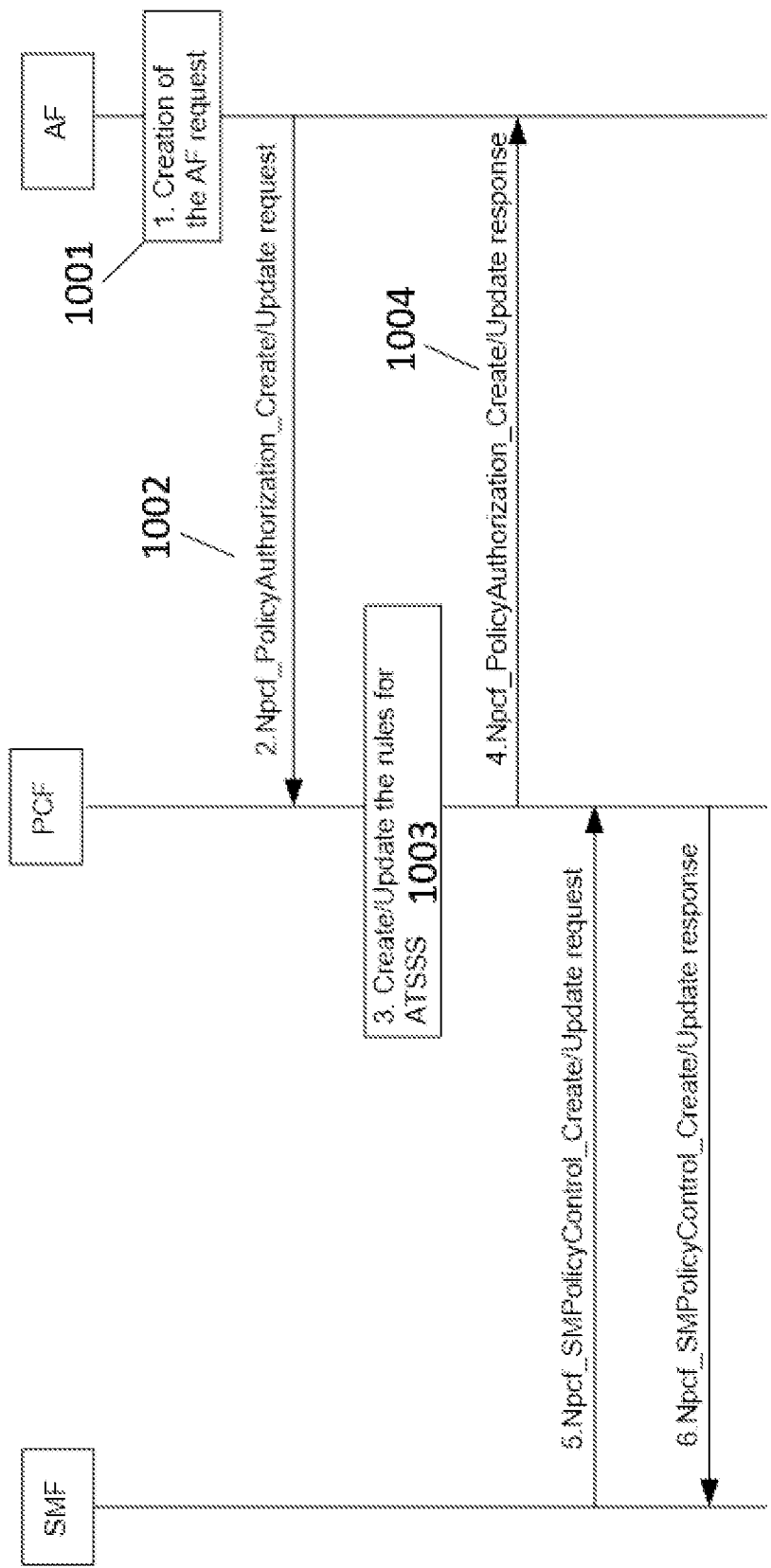
FIG. 10 illustrates a sequence diagram of an example procedure in which an AF provides steering requirements directly to the PCF in accordance with the present technology.

FIG. 10 illustrates a sequence diagram of an example procedure in which an AF provides steering requirements directly to the PCF in accordance with the present technology. The AF in this example can be a trusted AF.

Operation 1001: An AF (e.g., MEC AF) creates an AF request about multi-access traffic steering requirements for one or more user devices. The one or more user devices can be one or more UEs or one or more groups of UEs. The request can include application traffic descriptor(s) and steering functionality information. The steering functionality information can include the following:
(1) MPTCP server information, such as Fully Qualified Domain Name (FQDN), IP address, and/or port number;
(2) MPTCP proxy information, such as MPTCP proxy IP address;
(3) MP-QUIC server information, such as FQDN, IP address, and/or port number;
(4) ATSSS-LL functionality.

The steering functionality information can also include information about the steering mode, including but is not limited to:
(a) active-standby: the UE steers the traffic by using the active access if the active access is available. If the active access is not available and the standby access is available, the UE steers the traffic by using the standby access;
(b) smallest delay: the UE steers the traffic by using the access network with the smallest round-trip-time (RTT);
(c) load balancing: the UE steers the traffic across both the 3GPP access and the non-3GPP access with a given percentage; or
(d) priority based: the UE steers the traffic over the access with high priority unless the access with high priority is congested, when the UE steers the SDF over both the access with high priority and the access with low priority.

In some embodiments, at least part of the above parameters regarding steering functionality information is optionally included in the request.

Operation 1002: The AF sends the request as a Npcf_PolicyAuthorization_Create/Update request to the PCF.

Operation 1003: The PCF creates or updates the rules for ATSSS based on the received traffic routing related information.

Operation 1004: The PCF sends the response message to the AF.

Figure 11:
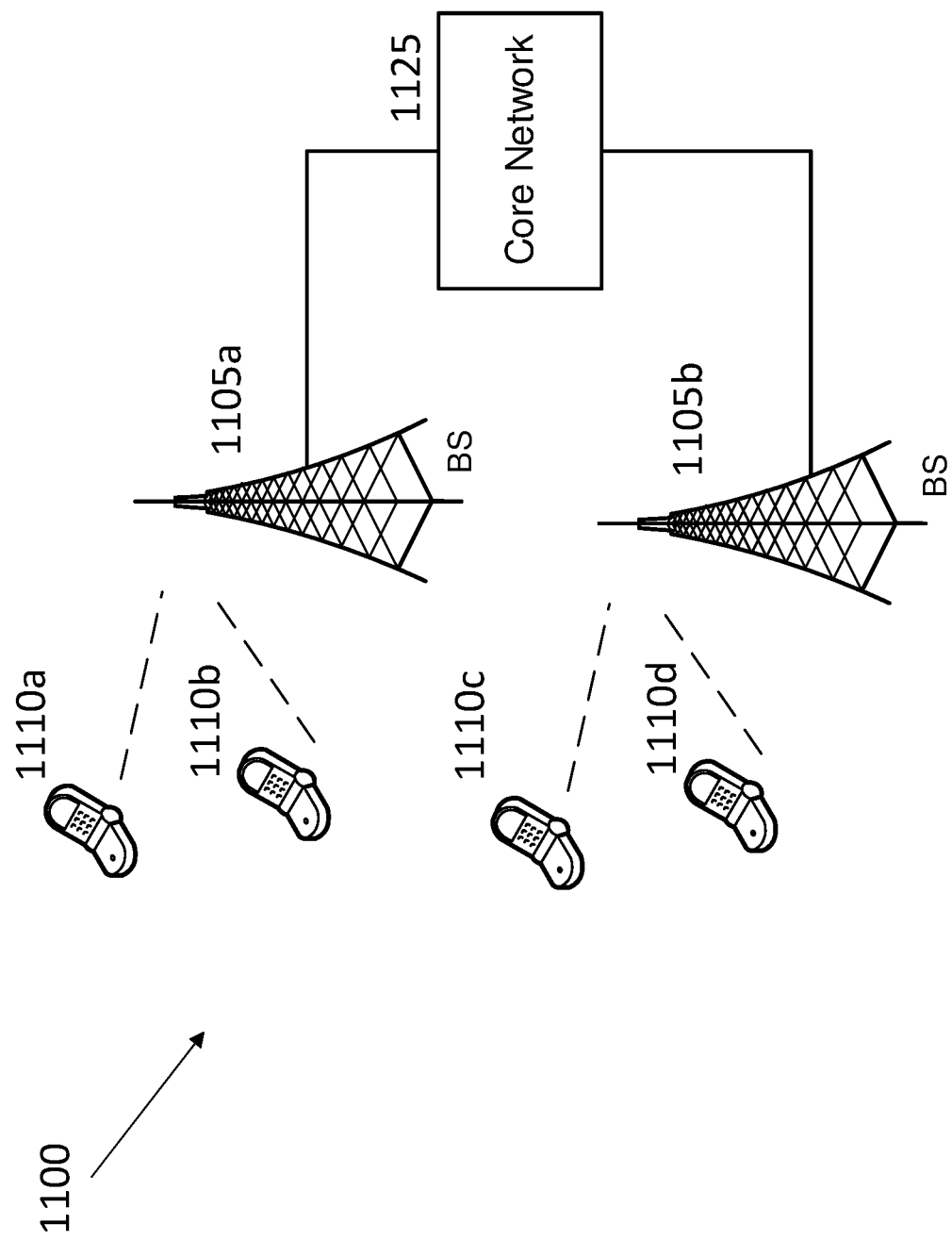
FIG. 11 shows an example of a wireless communication system where techniques in accordance with one or more embodiments of the present technology can be applied.

FIG. 11 shows an example of a wireless communication system 1100 where techniques in accordance with one or more embodiments of the present technology can be applied. A wireless communication system 1100 can include one or more base stations (BSs) 1105a, 1105b, one or more wireless devices 1110a, 1110b, 1110c, 1110d, and a core network 1125. A base station 1105a, 1105b can provide wireless service to wireless devices 1110a, 1110b, 1110c and 1110d in one or more wireless sectors. In some implementations, a base station 1105*a*, 1105*b* includes directional antennas to produce two or more directional beams to provide wireless coverage in different sectors.

The core network 1125 can communicate with one or more base stations 1105*a*, 1105*b*. The core network 1125 provides connectivity with other wireless communication systems and wired communication systems. The core network may include one or more service subscription databases to store information related to the subscribed wireless devices 1110*a*, 1110*b*, 1110*c*, and 1110*d*. A first base station 1105*a* can provide wireless service based on a first radio access technology, whereas a second base station 1105*b* can provide wireless service based on a second radio access technology. The base stations 1105*a* and 1105*b* may be co-located or may be separately installed in the field according to the deployment scenario. The wireless devices 1110*a*, 1110*b*, 1110*c*, and 1110*d* can support multiple different radio access technologies. The techniques and embodiments described in the present document may be implemented by the base stations of wireless devices described in the present document.

Figure 12:
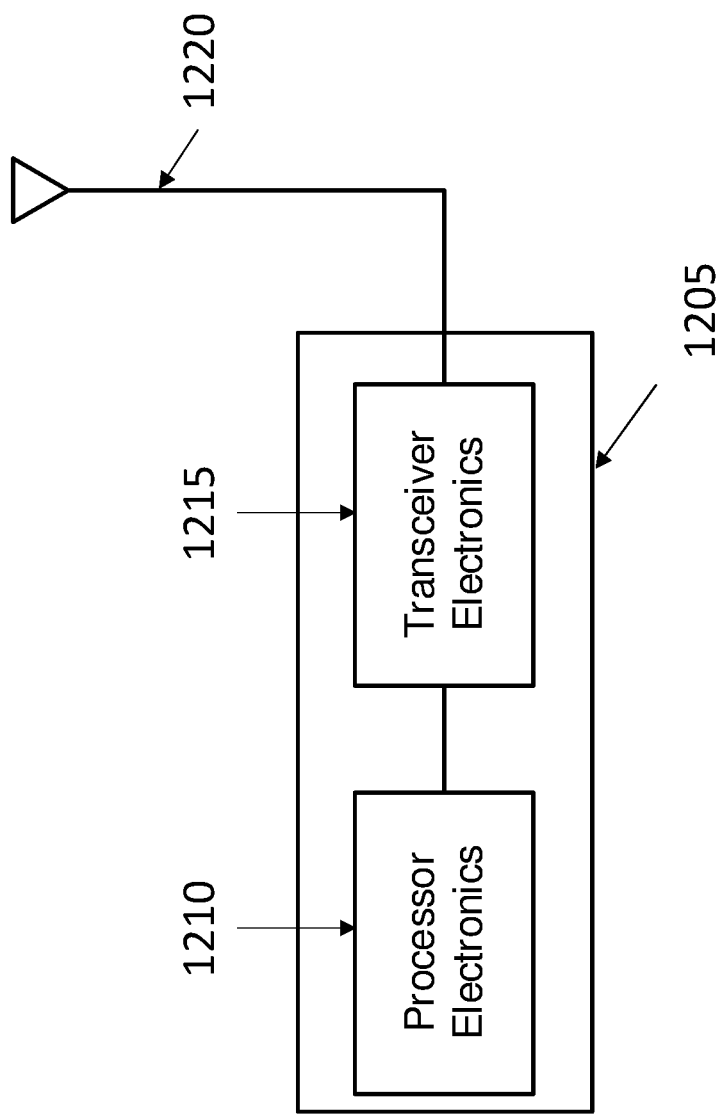
FIG. 12 is a block diagram representation of a portion of a radio station in accordance with one or more embodiments of the present technology can be applied.

FIG. 12 is a block diagram representation of a portion of a radio station in accordance with one or more embodiments of the present technology can be applied. A radio station 1205 such as a base station or a wireless device (or UE) can include processor electronics 1210 such as a microprocessor that implements one or more of the wireless techniques presented in this document. The radio station 1205 can include transceiver electronics 1215 to send and/or receive wireless signals over one or more communication interfaces such as antenna 1220. The radio station 1205 can include other communication interfaces for transmitting and receiving data. Radio station 1205 can include one or more memories (not explicitly shown) configured to store information such as data and/or instructions. In some implementations, the processor electronics 1210 can include at least a portion of the transceiver electronics 1215. In some embodiments, at least some of the disclosed techniques, modules or functions are implemented using the radio station 1205.

It will be appreciated that the present document discloses techniques that can be embodied in various embodiments to allow application functions (e.g., MEC AFs) to influence how the PCF determines ATSSS control, instead of relying solely on the PCT, thereby accommodating network requirements for different scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
    transmitting a request from a multi-access edge computing (MEC) application function to a network function to enable a creation or an update of a policy or a rule for access traffic routing, the request including one or more parameters indicating access traffic routing information for one or more user devices, wherein the one or more parameters comprise at least an access type preference for the one or more user devices,
    wherein the access traffic routing information includes steering functionality information, the steering functionality information including Multipath QUIC server information, the Multipath QUIC server information comprising at least one of a fully qualified domain name, an Internet Protocol (IP) address, or a port number,
    and wherein the network function comprises a network exposure function or a policy control function; and
    receiving a response from the network function indicating the creation or the update of the policy or the rule for access traffic routing.

2. The method of claim 1, wherein the access type preference indicates a preference for (1) a first access technology in a first protocol suite, (2) a second access technology different from the first protocol suite, or (3) a combination of the first access technology and the second access technology.

3. The method of claim 1, wherein the one or more parameters further comprise at least one of: a traffic descriptor, a preferred IP type, a time window for data transfer, or a location criterion.

4. The method of claim 1, wherein the one or more parameters comprise proxy information of a Multipath Transmission Control Protocol, the proxy information comprising at least a proxy Internet Protocol address.

5. The method of claim 1, wherein the access traffic routing information comprises traffic steering requirements, and wherein the one or more parameters comprise (1) a lower-layer functionality related to access traffic steering, switching, splitting; or (2) a traffic steering mode, the traffic steering mode comprising at least one of: an active-standby mode, a smallest delay mode, a load balancing mode, or a priority-based mode.

6. A method for wireless communication, comprising:
    receiving, by a policy control function, a request from a multi-access edge computing (MEC) application function to enable a creation or an update of a policy or a rule for access traffic routing, the request including one or more parameters indicating access traffic routing information for one or more user devices, wherein the one or more parameters comprise at least an access type preference for the one or more user devices,
    wherein the access traffic routing information includes steering functionality information, the steering functionality information including Multipath QUIC server information, the Multipath QUIC server information comprising at least one of a fully qualified domain name, an Internet Protocol address, or a port number;
    creating or updating the policy or the rule for access traffic routing based on the one or more parameters; and
    transmitting, by the policy control function, a response indicating the creation or the update of the policy or the rule for access traffic routing.

7. The method of claim 6, wherein the access type preference indicates a preference for (1) a first access technology in a first protocol suite, (2) a second access technology different from the first protocol suite, or (3) a combination of the first access technology and the second access technology.

8. The method of claim 6, wherein the one or more parameters further comprise at least one of: a traffic descriptor, a preferred IP type, a time window for data transfer, or a location criterion.

9. The method of claim 6, wherein the one or more parameters comprise proxy information of a Multipath Transmission Control Protocol, the proxy information comprising at least a proxy Internet Protocol address.

10. The method of claim 6, wherein the access traffic routing information comprises traffic steering requirements, and wherein the one or more parameters comprise (1) a lower-layer functionality related to access traffic steering, switching, splitting; or (2) a traffic steering mode, the traffic steering mode comprising at least one of: an active-standby mode, a smallest delay mode, a load balancing mode, or a priority-based mode.

11. An apparatus for wireless communication comprising a processor and a memory storing instructions, execution of which by the processor causes the apparatus to perform operations comprising:
    transmitting a request from a multi-access edge computing (MEC) application function to a network function to enable a creation or an update of a policy or a rule for access traffic routing, the request including one or more parameters indicating access traffic routing information for one or more user devices, wherein the one or more parameters comprise at least an access type preference for the one or more user devices,
    wherein the access traffic routing information includes steering functionality information, the steering functionality information including Multipath QUIC server information, the Multipath QUIC server information comprising at least one of a fully qualified domain name, an Internet Protocol (IP) address, or a port number,
    and wherein the network function comprises a network exposure function or a policy control function; and
    receiving a response from the network function indicating the creation or the update of the policy or the rule for access traffic routing.

12. The apparatus of claim 11, wherein the access type preference indicates a preference for (1) a first access technology in a first protocol suite, (2) a second access technology different from the first protocol suite, or (3) a combination of the first access technology and the second access technology.

13. The apparatus of claim 11, wherein the one or more parameters further comprise at least one of: a traffic descriptor, a preferred IP type, a time window for data transfer, or a location criterion.

14. The apparatus of claim 11, wherein the one or more parameters comprise (1) proxy information of a Multipath Transmission Control Protocol, the proxy information comprising at least a proxy Internet Protocol address.

15. The apparatus of claim 11, wherein the access traffic routing information comprises traffic steering requirements, and wherein the one or more parameters comprise (1) a lower-layer functionality related to access traffic steering, switching, splitting; or (2) a traffic steering mode, the traffic steering mode comprising at least one of: an active-standby mode, a smallest delay mode, a load balancing mode, or a priority-based mode.

16. An apparatus for wireless communication comprising a processor and a memory storing instructions, execution of which by the processor causes the apparatus to perform operations comprising:
receiving, by a policy control function, a request from a multi-access edge computing (MEC) application function to enable a creation or an update of a policy or a rule for access traffic routing, the request including one or more parameters indicating access traffic routing information for one or more user devices, wherein the one or more parameters comprise at least an access type preference for the one or more user devices,
wherein the access traffic routing information includes steering functionality information, the steering functionality information including Multipath QUIC server information, the Multipath QUIC server information comprising at least one of a fully qualified domain name, an Internet Protocol address, or a port number;
creating or updating the policy or the rule for access traffic routing based on the one or more parameters; and
transmitting, by the policy control function, a response indicating the creation or the update of the policy or the rule for access traffic routing.

17. The apparatus of claim 16, wherein the access type preference indicates a preference for (1) a first access technology in a first protocol suite, (2) a second access technology different from the first protocol suite, or (3) a combination of the first access technology and the second access technology.

18. The apparatus of claim 16, wherein the one or more parameters further comprise at least one of: a traffic descriptor, a preferred Internet Protocol (IP) IP type, a time window for data transfer, or a location criterion.

19. The apparatus of claim 16, wherein the one or more parameters comprise proxy information of a Multipath Transmission Control Protocol, the proxy information comprising at least a proxy Internet Protocol address.

20. The apparatus of claim 16, wherein the access traffic routing information comprises traffic steering requirements, and wherein the one or more parameters comprise (1) a lower-layer functionality related to access traffic steering, switching, splitting; or (2) a traffic steering mode, the traffic steering mode comprising at least one of: an active-standby mode, a smallest delay mode, a load balancing mode, or a priority-based mode.

\* \* \* \* \*